C. H. DOOLEY.
PLANTER.
APPLICATION FILED MAR. 24, 1910.
1,067,594.
Patented July 15, 1913.
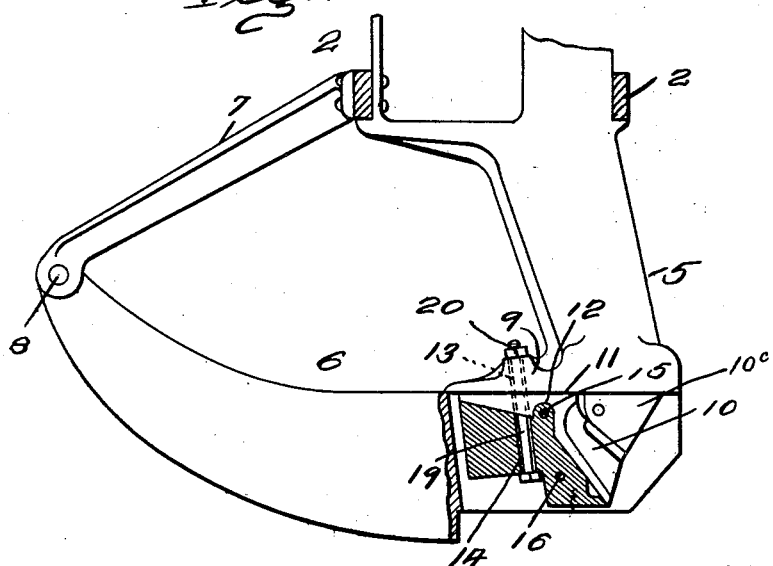
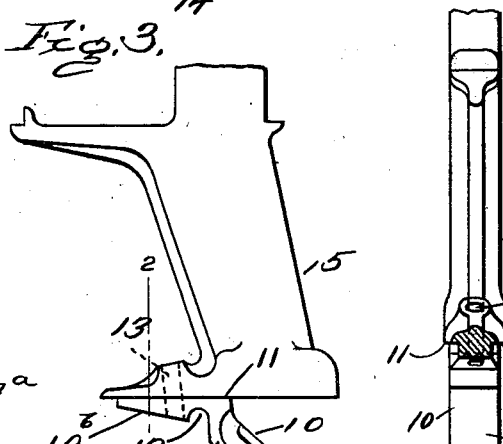
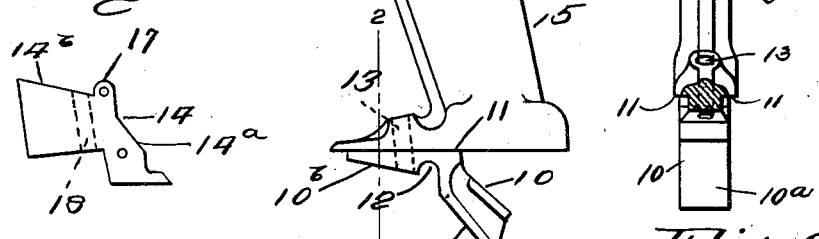
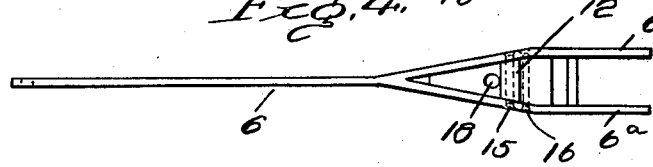
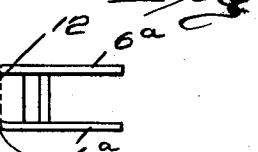
Witnesses
Inventor
Clarence H. Dooley
By H. H. Bliss
Attorney

UNITED STATES PATENT OFFICE.

CLARENCE H. DOOLEY, OF ROCK ISLAND, ILLINOIS.

PLANTER.

1,067,594.  Specification of Letters Patent.  Patented July 15, 1913.

Application filed March 24, 1910. Serial No. 551,236.

*To all whom it may concern:*

Be it known that I, CLARENCE H. DOOLEY, a citizen of the United States, residing at Rock Island, in the county of Rock Island and State of Illinois, have invented certain new and useful Improvements in Planters, of which the following is a specification, reference being had therein to the accompanying drawing.

This invention relates to improvements in planters and more particularly in those parts of planters which are used for opening furrows to receive the seed.

The invention is especially applicable to corn planters having a seed boot, through which the seeds pass on their way from the hopper to the ground, and a furrow opening runner which is secured to the lower end of the seed boot.

The object of the present invention is to provide an improved boot construction and improved means for fastening the runner to the seed boot.

Referring to the accompanying drawings—Figure 1 is a side elevation of a seed boot and runner embodying my invention, some of the parts being broken away and sectioned to show the construction. Fig. 2 is a vertical transverse section on the line 2—2 of Fig. 3. Fig. 3 is a side elevation of the seed boot. Fig. 4 is a plan view of the runner; and Fig. 5 is a view showing one of the runner holding blocks.

In the drawings 2, 2, represent the main bars of the front frame of a planter. To these bars there is secured the seed boot 5 through which seeds are conducted from a seed hopper (not shown) to the ground. The passage of the seeds from the lower end of the duct to the soil is controlled by a movable valve $10^c$.

6 is a runner adapted to open a furrow to receive the seeds, the rear end of the runner being rigidly secured to the lower end of the seed boot, and its front end being supported by a brace bar 7 to which it is secured by bolt 8.

The runner which I have designated, as an entirety, by the numeral 6 comprises a main body part and a rear forked part, the two branches of which are designated $6^a$, $6^a$. In making the runner, one of the branch plates $6^a$ is preferably integral with the main part while the other branch part $6^a$ is welded thereto. Heretofore, in making this part of a planter, it has been customary to secure these runner blades to the lower end of the cast shank, or boot, by means of one or more rivets arranged horizontally and passing through the blades and through the lower part of the shank. To receive these rivets, countersunk apertures must be formed in the blades, and the heads of the rivets must be up-set in such way that they will fill, but not project beyond, the countersunk apertures. The earth contacting surfaces of the runner blades must be perfectly smooth, and unobstructed, so that they will form clean shallow furrows. These surfaces must be self scouring, and devoid of obstructions, such as would catch straws, stalks, or other trash. Hence the necessity of countersinking the rivet apertures, and upsetting the rivet heads, so that smooth surfaces shall be produced. But serious disadvantages are incident to this manner of making and fastening the runners. In some soils they rapidly wear to such an extent as to become inoperative or seriously impaired. Again they require frequent sharpening. And in case of fracture another must be substituted. When, because of any of these reasons, it becomes necessary to remove a runner, and subsequently replace it, or substitute another for it, a serious problem or difficulty is presented to the farmer. He has to load more or less of the planter upon a vehicle, and carry it to a blacksmith shop where the rivet heads can be cut and the rivets withdrawn to permit the removal of the runner, in order that it may be sharpened or repaired, and replaced, or to permit the substitution of a new one. I have obviated these difficulties by constructing the runner, the shank and the fastening devices in a way herein presented.

At the lower end of the shank part of the boot 5 is a forward extending foot or toe 9 which is formed with a depending extension 10. The thickness of the extension 10 is less than that of the foot 9 so that downwardly exposed shoulders 11, 11 are formed. The extension 10 has inclined surfaces $10^a$, $10^b$ between which is formed a recess 12.

13 is a hole formed to receive a connecting bolt.

The depending extension 10 serves not only as an abutment for the runner securing parts to be described, but also as a seat or ledge for the seed valve $10^c$. As will be noted from an inspection of the drawings, this valve is located immediately above the upper inclined surface of the extension or valve seat 10 and at the lower end of the duct through the seed boot 5.

Between the plates 6ª, 6ª of the runner is secured a block 14 adapted to receive the fastening bolt. The block may be permanently secured to the runner blade, as by rivets 15 and 16. The block 14 is formed with inclined faces 14ª and 14ᵇ adapted to fit the faces 10ª and 10ᵇ, respectively, of the seed boot extension 10. And the block 14 is formed with a lug 17 which is adapted to enter the recess 12 of the said extension 10.

18 is a hole to receive the fastening bolt 19, this hole 18, as well as the whole 13, being made somewhat larger than the bolt 19 so that exact alinement of the two holes is not essential. It will be seen that when the parts are assembled and the bolt 19 drawn up by tightening its nut 20 the face 14ª of the block slides upon the inclined face 10ª of the extension 10, bringing the lug 17 of the block into tight engagement with the recess 12, thus rigidly locking the runner to the boot. When the parts are thus locked together, the upper edges of the runner-blades 6ª, 6ª lie under the shoulders 11 of the boot, thus forming a smooth exterior at the junction of the parts.

When the bolt is arranged in the way illustrated, and described, there are no projections extending outward from the earth contacting surfaces of the runner blades, so that these surfaces remain permanently self scouring and have no tendency to catch trash or foreign materials to interfere with the forming of a smooth, shallow furrow.

When the farmer desires to remove the runner for any purpose it is merely required that he shall loosen the bolt 19, and also that at 8. For all ordinary purposes, he is equipped on the farm for effecting the operations that are desired after the removal of a runner, such as re-shaping when bent, sharpening it, or the substituting of a new one. In the unusual event that blacksmithing is required, the only object which he has to carry to the shop is the runner itself.

Both in the blacksmith shop and in the factory where the machines are originally made, the riveting of the runner to the cast shank or boot results in the breakage of a large percentage of the shanks. In the shop cost alone, there is a great saving by having the fastening devices for the rear of the runner detachable in the way I have described.

What I claim is—

1. In a planter, a tubular shank having a downward projection provided at its rear side with a valve seat and at its forward side with a runner retaining surface, a valve movably associated with the valve seat, a bifurcated runner embracing the said projection and valve and provided with a block secured between its forks having a surface adapted to closely engage with the runner retaining surface of the projection, and means for detachably securing the runner to the shank, substantially as set forth.

2. In a planter, a tubular shank, a downward projection at the bottom of the shank, downward exposed shoulders being formed between the projection and the shank proper, the said projection having a valve seat at its rear side, and an inclined irregular surface at its forward side, a valve movably associated with the said seat, a bifurcated runner embracing the said projection and valve and having its forks in engagement with the said shoulders, a block secured between the said forks having an irregular surface corresponding to and contacting with the irregular surface of the projection, and means for detachably securing the runner in position with the two irregular surfaces in engagement, substantially as set forth.

In testimony whereof I affix my signature, in presence of two witnesses.

CLARENCE H. DOOLEY.

Witnesses:
GALE PORTER,
RALPH B. LOURIE.